(12) United States Patent
Kang et al.

(10) Patent No.: US 12,486,768 B2
(45) Date of Patent: Dec. 2, 2025

(54) METHOD AND SYSTEM FOR TEMPORARY COATING SUPPORTING AND PERMANENT BOLT SUPPORTING

(71) Applicants: CCTEG Coal Mining Research Institute, Beijing (CN); Tiandi Science & Technology Co.,Ltd, Beijing (CN)

(72) Inventors: Hongpu Kang, Beijing (CN); Pengfei Jiang, Beijing (CN); Ziyue Wang, Beijing (CN); Yongzheng Wu, Beijing (CN); Yaozhong Wei, Beijing (CN); Chang Liu, Beijing (CN); Jichang Guo, Beijing (CN); Chao Luo, Beijing (CN); Xiaoming Cao, Beijing (CN); Zhiliang Chen, Beijing (CN); Jianwei Yang, Beijing (CN)

(73) Assignees: CCTEG COAL MINING RESEARCH INSTITUTE, Beijing (CN); TIANDI SCIENCE & TECHNOLOGY CO., LTD, Beijing (CN)

( * ) Notice: Subject to any disclaimer, the term of this patent is extended or adjusted under 35 U.S.C. 154(b) by 239 days.

(21) Appl. No.: 18/062,095

(22) Filed: Dec. 6, 2022

(65) Prior Publication Data
US 2023/0095265 A1 Mar. 30, 2023

Related U.S. Application Data

(63) Continuation of application No. PCT/CN2021/121477, filed on Sep. 28, 2021.

(30) Foreign Application Priority Data

Sep. 28, 2020 (CN) .................. 202011044368.X
Sep. 28, 2020 (CN) .................. 202011045647.8

(51) Int. Cl.
| | | |
|---|---|---|
| *E21D 11/10* | (2006.01) | |
| *E21D 20/02* | (2006.01) | |
| *E21D 21/00* | (2006.01) | |

(52) U.S. Cl.
CPC .............. *E21D 11/10* (2013.01); *E21D 20/02* (2013.01); *E21D 21/008* (2013.01)

(58) Field of Classification Search
CPC ........ E21D 11/00; E21D 20/02; E21D 21/008; E21D 20/00; E21D 20/003
See application file for complete search history.

(56) References Cited

U.S. PATENT DOCUMENTS

| | | | |
|---|---|---|---|
| 2006/0161289 A1* | 7/2006 | Williams | .............. E21D 20/003 700/177 |
| 2008/0038068 A1* | 2/2008 | Craig | .................. E21D 21/0053 405/259.1 |

(Continued)

FOREIGN PATENT DOCUMENTS

| | | |
|---|---|---|
| CN | 101270667 | 9/2008 |
| CN | 103195441 | 7/2013 |

(Continued)

OTHER PUBLICATIONS

WIPO, International Search Report for PCT/CN2021/121477, Dec. 7, 2021.

(Continued)

*Primary Examiner* — Benjamin F Fiorello
(74) *Attorney, Agent, or Firm* — Hodgson Russ LLP

(57) ABSTRACT

Disclosed are a method and system for temporary coating supporting and permanent bolt supporting. Tunnel excavation construction operation is composed of a plurality of operation cycle units, and each of the operation cycle units includes: excavating by at least one row pitch to form a new tunnel; spraying a coating material onto a surface of the new tunnel to form a sealing coat on a surface of surrounding (Continued)

rock, wherein the sealing coat has an adhesive property and a sealing property both meeting preset conditions, and has a tensile strength and a toughness needed for supporting; and inserting bolts into the new tunnel to perform permanent supporting.

17 Claims, 10 Drawing Sheets

(56) References Cited

U.S. PATENT DOCUMENTS

| | | | |
|---|---|---|---|
| 2009/0220309 A1 | 9/2009 | Weaver et al. | |
| 2010/0231026 A1* | 9/2010 | Ebner | E21C 27/24 |
| | | | 299/33 |
| 2013/0330467 A1* | 12/2013 | Bond | E21D 11/10 |
| | | | 118/695 |
| 2017/0016325 A1* | 1/2017 | Kouhia | E21C 39/00 |
| 2017/0159434 A1* | 6/2017 | Pettersson | E21B 44/00 |
| 2017/0241205 A1* | 8/2017 | Comacchio | E21B 7/027 |
| 2017/0275947 A1* | 9/2017 | Morissette | B25D 17/28 |
| 2018/0252104 A1* | 9/2018 | Seo | E21D 13/00 |
| 2020/0095862 A1* | 3/2020 | Mänttäri | E21D 20/028 |
| 2020/0216706 A1* | 7/2020 | Cozzens | C08F 220/18 |
| 2020/0263499 A1* | 8/2020 | Koskinen | E21B 7/027 |
| 2020/0370434 A1* | 11/2020 | Jordaan | E21D 9/112 |

FOREIGN PATENT DOCUMENTS

| | | | | |
|---|---|---|---|---|
| CN | 103195442 | | 7/2013 | |
| CN | 103195442 A | * | 7/2013 | |
| CN | 103643963 A | | 3/2014 | |
| CN | 105637180 A | | 6/2016 | |
| CN | 107939418 A | * | 4/2018 | E02D 17/04 |
| CN | 108035754 | | 5/2018 | |
| CN | 108979688 | | 12/2018 | |
| CN | 109595007 A | | 4/2019 | |
| CN | 110939456 A | | 3/2020 | |
| CN | 111502700 A | | 8/2020 | |
| DE | 2620150 A1 | | 3/1978 | |
| DE | 3033487 A1 | | 3/1982 | |
| FR | 2277229 A1 | | 1/1976 | |

OTHER PUBLICATIONS

CNIPA, First Office Action for CN Application No. 202011045647.8, Feb. 25, 2022.
CNIPA, First Office Action for CN Application No. 202011044368.X, May 9, 2022.

* cited by examiner

METHOD AND SYSTEM FOR TEMPORARY COATING SUPPORTING AND PERMANENT BOLT SUPPORTING

CROSS-REFERENCE TO RELATED APPLICATION

This application is a continuation of International Application No. PCT/CN2021/121477, filed Sep. 28, 2021, which claims priority to Chinese Patent Application No. 202011044368.X, filed Sep. 28, 2020, and Chinese Patent Application No. 202011045647.8, filed Sep. 28, 2020. The entire disclosures of the above-identified applications are incorporated herein by reference.

FIELD

The present disclosure relates to the technical field of coal mining, and more particularly to a method and system for temporary coating supporting and permanent bolt supporting.

BACKGROUND

Coal is the main energy in China, and has played an important role in promoting national industrial development and national economic progress. The rapid excavation of coal mine tunnels has become a "bottleneck" problem that restricts the safe and efficient mining of coal. Optimizing the excavation and support technology, developing efficient, safe and reliable temporary supporting, and improving the permanent supporting efficiency are the fundamental ways to improve the tunnel forming speed. In related art, during the coal mining process, effective temporary supporting is performed on the surface of the surrounding rock of the coal mine tunnel immediately after an excavated section is formed. In addition, bolt supporting can effectively control the deformation of surrounding rock, and has been widely used in coal mining, metal mining and other fields at home and abroad. Taking coal mine tunnel supporting as an example, the existing bolt support process is as follows: drilling holes in the coal walls using drill pipes, manually injecting a resin anchoring agent into the drilled holes, inserting bolts for stirring, and pre-tightening when the resin anchoring agent solidifies.

However, the above supporting method is a kind of temporary supporting on the surface of surrounding rocks by metal beams and single hydraulic support, etc., which requires manual transportation, and has slow construction speed, insufficient supporting strength and poor supporting quality, and is labor-intensive. In addition, the existing bolt construction process is time-consuming, inefficient and labor-intensive, and is difficult to realize automation, which can no longer meet the needs of rapid supporting for coal mine tunnels.

SUMMARY

Embodiments of the present disclosure seek to solve at least one of the problems existing in the related art to at least some extent.

For this, a first objective of the present disclosure is to provide a method for temporary coating supporting and permanent bolt supporting, which seeks to solve problems existing in the related art that manual transportation is required for supporting, the construction speed is slow, the supporting strength is insufficient, the supporting quality is poor, and the labor intensity is high.

To achieve the above purposes, embodiments of a first aspect of the present disclosure provide a method for temporary coating supporting and permanent bolt supporting, in which tunnel excavation construction operation is composed of a plurality of operation cycle units, and each of the operation cycle units includes: excavating by at least one row pitch to form a new tunnel; spraying a coating material onto a surface of the new tunnel to form a sealing coat on a surface of surrounding rock; and inserting bolts into the new tunnel to perform permanent supporting. The sealing coat has an adhesive property and a sealing property both meeting preset conditions, and has a tensile strength and a toughness needed for supporting.

In addition, the method for temporary coating supporting and permanent bolt supporting according to the above-mentioned embodiments of the present application may further have the following additional technical features.

According to an embodiment of the present disclosure, the spraying the coating material onto the surface of the new tunnel to form the sealing coat on the surface of the surrounding rock includes: determining a surrounding rock parameter of a region of the surface of the surrounding rock to be sprayed; determining a spraying thickness of the region to be sprayed according to the surrounding rock parameter; and spraying the coating material onto the surface of the new tunnel according to the spraying thickness to form the sealing coat.

According to an embodiment of the present disclosure, the coating material includes a first material with an adhesive property meeting an adhesive condition and a second material with a sealing property meeting a sealing condition, the adhesive property of the first material is greater than that of the second material, and gas tightness of the second material is greater than that of the first material.

According to an embodiment of the present disclosure, the spraying the coating material onto the surface of the new tunnel to form the sealing coat on the surface of the surrounding rock includes: spraying the first material onto the surface of the surrounding rock of the surface of the new tunnel, the first material being adhered to the surface of the surrounding rock in virtue of the adhesive property of the first material; spraying the second material onto the surface of the surrounding rock sprayed with the first material, to form the sealing coat in virtue of the sealing property of the second material.

According to an embodiment of the present disclosure, the surrounding rock parameter includes at least one selected from: flatness of the region to be sprayed and a gap parameter of the region to be sprayed; and the gap parameter includes at least one selected from: the number of gaps, gap size and gap depth.

According to an embodiment of the present disclosure, the coating material is a third material having a sealing property meeting a sealing condition.

According to an embodiment of the present disclosure, the method further includes: acquiring a coating quality of the region to be sprayed during the spraying, and adjusting a spraying angle according to the coating quality.

According to an embodiment of the present disclosure, after spraying the coating material onto the surface of the new tunnel to form the sealing coat on the surface of the surrounding rock, the method further includes: determining whether the sealing coat meets a supporting requirement; and if the sealing coat does not meet the supporting requirement, continuing spraying the coating material or performing a grouting treatment to an acquisition region corresponding to the image.

According to an embodiment of the present disclosure, within 300 seconds after completion of the spraying, the sealing coat formed by the coating material has a tensile strength of >1 MPa, an adhesive strength of >0.5 MPa, a shear strength of >1 MPa, an elongation of >30%, and a compressive strength of >2 MPa.

According to an embodiment of the present disclosure, the coating material finally has a tensile strength of >3 MPa, a shear strength of >4 MPa, an elongation of >30%, and a compressive strength of >20 MPa.

According to an embodiment of the present disclosure, the coating material is an organic material, and has a flash point of ≥200° C. and an oxygen index of ≤35%.

According to an embodiment of the present disclosure, the coating material has a maximum reaction temperature of ≤90° C.

According to an embodiment of the present disclosure, the coating material has a flame retardant property and an antistatic property.

According to an embodiment of the present disclosure, the inserting bolts into the new tunnel to perform permanent supporting includes: inserting roof bolts into a top of the new tunnel and inserting rib bolts into two sidewalls of the new tunnel.

The method for temporary coating supporting and permanent bolt supporting according to embodiments of the first aspect of the present disclosure can effectively support the newly formed tunnel by spraying the coat thereon, and can realize front excavation and rear supporting through simple processes. The surrounding rock can be supported by the method according to the present disclosure, without using roadheader loaded roof or self-moving shield, which reduces the time-consuming and increases the supportable area of the tunnel, and meets the needs of rapid excavation of the coal mine tunnel. In addition, the tunnel can be supported by the method according to the present disclosure, without using manual transportation, which reduces the labor intensity and improves the supporting efficiency.

To achieve the above purposes, embodiments of a second aspect of the present disclosure provide a system for temporary coating supporting and permanent bolt supporting, including: an excavating device, configured to excavate by at least one row pitch to form a new tunnel; a spraying device, configured to spray a coating material onto a surface of the new tunnel to form a sealing coat on a surface of surrounding rock as supporting layer; and a permanent supporting device, configured to insert bolts into the new tunnel to form permanent supporting. The sealing coat has an adhesive property and a sealing property both meeting preset conditions, and has a tensile strength and a toughness needed for supporting.

According to an embodiment of the present disclosure, the spraying device includes: a third mechanical arm, disposed on a body; a spraying assembly, having a spraying end connected to the third mechanical arm; and a driving assembly, disposed on the body and connected to the third mechanical arm, and configured to drive the third mechanical arm to enable the spraying assembly to spray the coating material onto the surface of the new tunnel to form the sealing coat.

According to an embodiment of the present disclosure, the spraying assembly includes: a spraying head and a pumping equipment, and the pumping equipment is configured to pump the coating material from a storage area to the spraying head via a transporting pipeline for spraying out through the spraying head.

According to an embodiment of the present disclosure, the spraying assembly includes a spraying head, a storage area, a pumping equipment, and a transporting pipeline connecting the spraying head with the pumping equipment, the spraying head is configured as the spraying end of the spraying assembly and connected to the third mechanical arm, and the pumping equipment is configured to pump the coating material from the storage area to the spraying head via the transporting pipeline for spraying out through the spraying head.

According to an embodiment of the present disclosure, the spraying head includes one or more nozzles with different spraying directions, is connected to the third mechanical arm through a rotating member and is rotatable in any direction around the third mechanical arm through the rotating member.

The system for temporary coating supporting and permanent bolt supporting according to embodiments of the second aspect of the present disclosure can effectively support the newly formed tunnel by spraying the coat thereon, and can realize front excavation and rear supporting through simple processes. The surrounding rock can be temporarily supported by the system according to the present disclosure, without using roadheader loaded roof or self-moving shield, which reduces the time-consuming and increases the supportable area of the tunnel, and meets the needs of rapid excavation of the coal mine tunnel. In addition, the tunnel can be supported by the system according to the present disclosure, without using manual transportation, which reduces the labor intensity and improves the supporting efficiency.

To achieve the above purposes, embodiments of a third aspect of the present disclosure provide a bolt supporting device for drilling, grouting, anchoring and pre-tightening operations. The bolt supporting device includes: a bolt mechanism, including a bolt having a grouting channel therein in a length direction thereof; a driving mechanism, connected to the bolt mechanism and configured to drive the bolt to rotate to perform drilling and pre-tightening operations; a grouting mechanism, connected to the grouting channel, and configured to grout the grouting channel; and an advancing mechanism, connected to the driving mechanism, and configured to advance the bolt to drill.

According to an embodiment of the present disclosure, the bolt is provided with a drilling bit at a first end thereof, and the drilling bit is provided with a grout outlet communicated with the grouting channel.

According to an embodiment of the present disclosure, the bolt is provided at a second end thereof with a limiting block, a pre-tightening nut, a self-aligning ball gasket and a tray in sequence in a direction from the second end to the first end of the bolt, and the second end of the bolt has a screw thread fitted with the pre-tightening nut.

According to an embodiment of the present disclosure, the limiting block is provided with a grouting through-hole communicated with the grouting channel.

According to an embodiment of the present disclosure, the driving mechanism includes a driver, and an output end of the driver is connected to the pre-tightening nut for driving the pre-tightening nut to rotate forwardly or reversely.

According to an embodiment of the present disclosure, the driver is an electric motor, an air cylinder, a hydraulic cylinder or an internal combustion engine.

According to an embodiment of the present disclosure, the grouting mechanism includes a grouting pump, and the grouting pump has a grout conveying port connected to the grouting channel.

According to an embodiment of the present disclosure, the advancing mechanism includes a base and a drilling arm disposed on the base, an output end of the drilling arm is connected to the driving mechanism for advancing the bolt in a drilling direction.

According to an embodiment of the present disclosure, the base is provided with a guide rail arranged in the drilling direction, and the driving mechanism is slidably disposed on the guide rail.

The bolt supporting device for drilling, grouting, anchoring and pre-tightening operations according to embodiments of the third aspect of the present disclosure achieves the drilling operation on the surrounding rock and the pre-tightening operation on the bolt by providing the grouting channel in the bolt, providing the driving mechanism to drive the rotation of the bolt, and providing the advancing mechanism to advance the bolt to drill. The grouting mechanism grouts the drilled hole through the grouting channel to realize the anchoring effect of the bolt. As a result, the bolt supporting device integrates the drilling, grouting, anchoring and pre-tightening operations. In addition, the bolt supporting device has a simple structure and simplified construction processes, and is convenient to operate, which not only guarantees the supporting effect and improves the supporting efficiency, but also realizes the automatic operations.

To achieve the above purposes, embodiments of a fourth aspect of the present disclosure provide a construction method of the bolt supporting device as described above, including: driving the bolt by the driving mechanism to rotate in a first direction, and advancing the bolt by the advancing mechanism to drill to a preset depth; grouting a drilled hole by the grouting mechanism to a preset anchoring length through the grouting channel; and driving the pre-tightening nut of the bolt mechanism by the driving mechanism to rotate in a second direction and pre-tighten.

The construction method of the above-described bolt supporting device according to embodiments of the fourth aspect of the present disclosure achieves the drilling operation on the surrounding rock and the pre-tightening operation on the bolt by providing the grouting channel in the bolt, providing the driving mechanism to drive the rotation of the bolt, and providing the advancing mechanism to advance the bolt to drill. The grouting mechanism grouts the drilled hole through the grouting channel to realize the anchoring effect of the bolt. As a result, the drilling, grouting, anchoring and pre-tightening operations of the bolt supporting device are integrated. In addition, the bolt supporting device has a simple structure, the construction method is simplified and is convenient to operate, which not only guarantees the supporting effect and improves the supporting efficiency, but also realizes the automatic operations.

BRIEF DESCRIPTION OF THE DRAWINGS

In FIG. 1 to FIG. 6:
- 1: excavating device; 2: transportation device; 3: closed device; 4: ventilation pipeline; 5: spraying device; 6: vacuum suction head; 7: vacuum generating device; 8: rock bolting jumbo; 81: roof bolt; 82: rib bolt; 9: surrounding rock;
- 01: sucking disc holder; 02: first sealing ring; 04: ball bearing; 05: flexible connecting sleeve; 06: shaft sleeve; 07: flange plate; 08: second sealing ring; 09: quick joint sleeve; 013: groove.

In FIG. 13 to FIG. 17:
- 2-1: base; 2-2: driver; 2-3: grouting pump; 2-4: bolt; 2-5: drilling bit; 2-6: limiting block; 2-7: pre-tightening nut; 2-8: self-aligning ball gasket; 2-9: tray; 2-10: surrounding rock; 2-11: guide rail; 2-12: drilling arm; 2-13: drilled hole; 2-14: grouting channel; 2-15: grouting through-hole; 2-16: grout outlet.

DETAILED DESCRIPTION

For a better understanding of the above technical solutions, the example embodiments of the present disclosure will be described in more detail below with reference to the accompanying drawings. Although the example embodiments of the present disclosure are shown in the accompanying drawings, it should be understood that the present disclosure may be implemented in various forms and should not be limited by the embodiments set forth herein. On the contrary, these embodiments are provided to enable a more thorough understanding of the present disclosure and to convey the scope of the present disclosure to those skilled in the art.

A method for temporary coating supporting and permanent bolt supporting includes a plurality of operation cycle units, and each of the operation cycle units includes the following steps.

Figure 1:
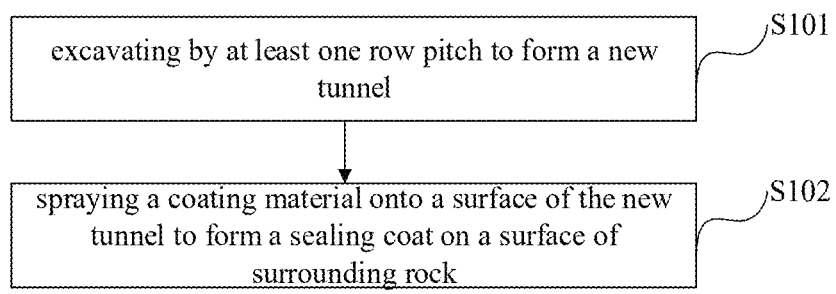
FIG. 1 is a flow chart of a method for temporary coating supporting and permanent bolt supporting provided in an embodiment of the present disclosure.

FIG. 1 is a flow chart of a method for temporary coating supporting and permanent bolt supporting provided by the present disclosure.

At S101, at least one row pitch is excavated to form a new tunnel.

In the present disclosure, the surrounding rock is excavated by an excavating device 1, and one or more row pitches may be excavated at a time, to form a new tunnel.

At S102, a coating material is sprayed onto a surface of the new tunnel to form a sealing coat on a surface of surrounding rock.

In the present disclosure, the excavating device 1 is provided with a spraying device 5, the spraying device 5 is able to spray the coating material onto the surface of the new tunnel, so as to form the sealing coat on the surface of surrounding rock 9.

As a possible implementation, the coating material has an adhesive property and a sealing property both meeting preset conditions, and the sealing coat formed by the coating material after the spraying has a tensile strength and a toughness needed for supporting. The coating material is a third material having an adhesive property and a sealing property both meeting a sealing condition. In this case, only one kind of coating material is sprayed.

The sealing coat that can be formed by spraying the coating material onto the surface of the surrounding rock can prevent the rib spalling and play a protective role similar to that played by a metal mesh in bolt-cable supporting.

Optionally, within 300 seconds after completion of the spraying, the sealing coat formed by the coating material has a tensile strength of >1 MPa, an adhesive strength of >0.5 MPa, a shear strength of >1 MPa, an elongation of >30%, and a compressive strength of >2 MPa. Further, the coating material finally has a tensile strength of >3 MPa, a shear strength of >4 MPa, an elongation of >30%, and a compressive strength of >20 MPa.

After the coating material is sprayed and the reaction among the material is completed, the formed sealing coat does not react with water. That is, the coating material in the sealing coat will not continue expanding when subjected to water, and keep the compressive strength, the shear strength and the tensile strength not decreased, so that the supporting effect of the sealing coat will not decrease when the sealing coat is subjected to water, thereby avoiding the occurrence of accidents.

Optionally, the coating material is an organic material, and has a flash point of ≥200° C. and an oxygen index of ≤35%, so as to avoid fire hazard and thus reduce the probability of serious safety accidents. The coating material may also be an inorganic material. For environmental protection requirements, the coating material needs to be a non-toxic, odorless and pollution-free material.

The usage environment temperature of the coating material is generally within the range from 0) to 70° C. Optionally, the coating material has a maximum reaction temperature of ≤90° C.

Optionally, the coating material further has a flame retardant property and an antistatic property.

As another possible implementation, the coating material includes a first material with an adhesive property meeting an adhesive condition and a second material with a sealing property meeting a sealing condition, and the adhesive property of the first material is greater than that of the second material. The first material is a material having strong adhesiveness. Optionally, the first material may be a foaming material, and the foaming material may be a polyurethane material. Gas tightness of the second material is greater than that of the first material, and the second material is an airtight thin spray material. For example, the airtight thin spray material may be a flexible supporting material, such as TSL (Thin spray-on liner) material.

It should be illustrated that the above only describes some specific examples of the coating material, and the present disclosure is mainly aimed at the supporting process, so other coating material with similar functions may also be used in the present disclosure.

Therefore, the method according to embodiments of the present disclosure can effectively support the newly formed tunnel by spraying the coat thereon, and can realize front excavation and rear supporting through simple processes. The surrounding rock can be supported by the method according to the present disclosure, without using roadheader loaded roof or self-moving shield, which reduces the time-consuming and increases the supportable area of the tunnel, and meets the needs of rapid excavation of the coal mine tunnel. In addition, the tunnel can be supported by the method according to the present disclosure, without using manual transportation, which reduces the labor intensity and improves the supporting efficiency.

Figure 2:
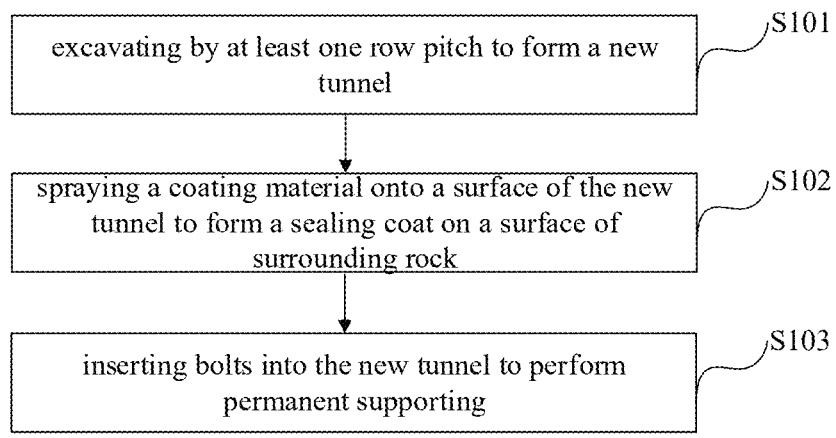
FIG. 2 is a flow chart of a method for temporary coating supporting and permanent bolt supporting provided in an embodiment of the present disclosure.

FIG. 2 is a flow chart of a method for temporary coating supporting and permanent bolt supporting provided in an embodiment of the present disclosure. On the basis of the above embodiments, the method may further include the following steps.

At S103, bolts are inserted into the new tunnel to perform permanent supporting.

In the present disclosure, after the sealing coat is formed, in order to make the tunnel safer, bolts may be inserted into the new tunnel by a rock bolting jumbo. The rock bolting jumbo can follow a roadheader to move forward, and the rock bolting jumbo can insert roof bolts into a top of the new tunnel and insert rib bolts into two sidewalls of the new tunnel.

Figure 3:
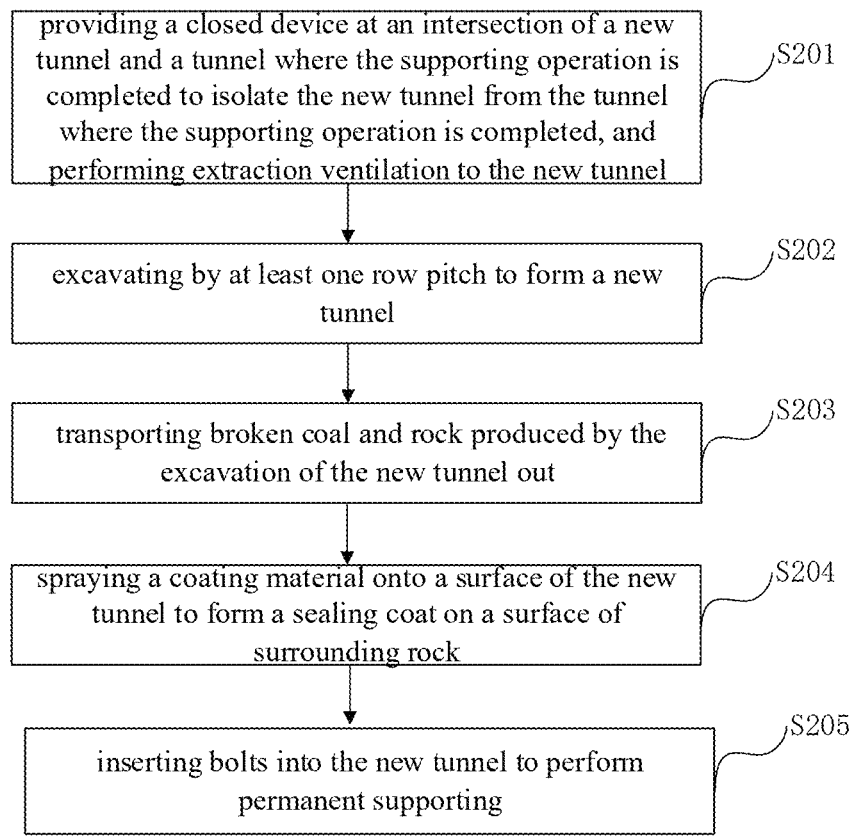
FIG. 3 is a flow chart of a method for temporary coating supporting and permanent bolt supporting provided in an embodiment of the present disclosure.

FIG. 3 is a flow chart of a method for temporary coating supporting and permanent bolt supporting provided in an embodiment of the present disclosure. As shown in FIG. 3, the method specifically includes the following steps.

At S201, a closed device is provided at an intersection of a new tunnel and a tunnel where the supporting operation is completed to isolate the new tunnel from the tunnel where the supporting operation is completed, and the new tunnel is subjected to extraction ventilation.

At S202, at least one row pitch is excavated to form the new tunnel.

At S203, broken coal and rock produced by the excavation of the new tunnel is transported out.

At S204, a coating material is sprayed onto a surface of the new tunnel to form a sealing coat on a surface of surrounding rock.

At S205, bolts are inserted into the new tunnel to perform permanent supporting.

Figure 5:
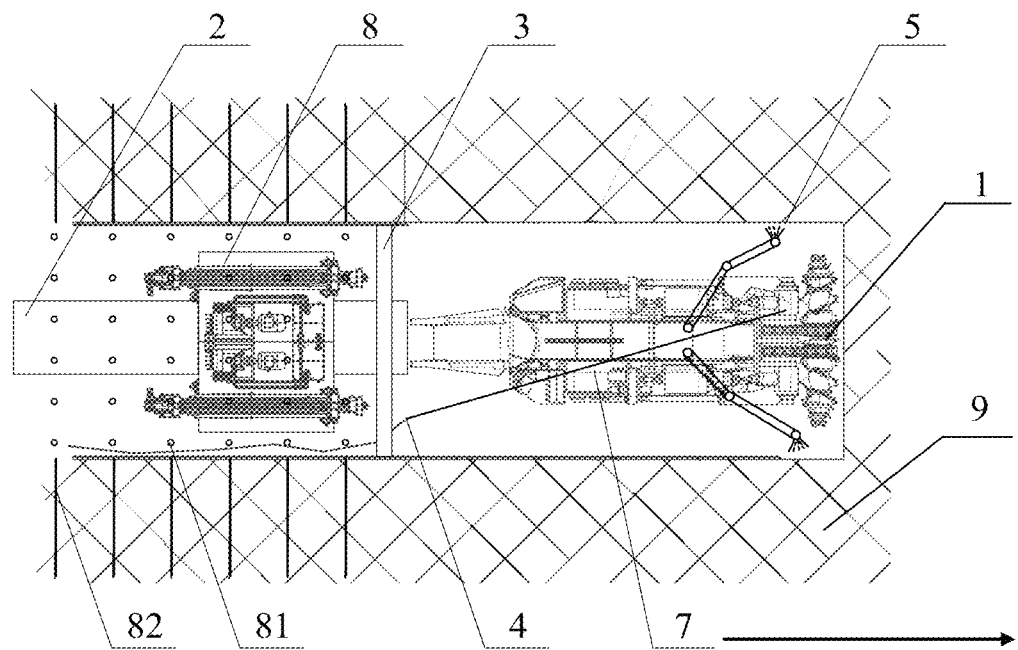
FIG. 5 is a spatial top view of a system for temporary coating supporting and permanent bolt supporting provided in an embodiment of the present disclosure.

As shown in FIG. 5, a system for temporary coating supporting and permanent bolt supporting is provided, which includes an excavating device 1, a closed device 3, a ventilation pipeline 4 and a spraying device 5.

The closed device 3 is provided at an intersection of a tunnel where the supporting operation is not completed and a tunnel where the supporting operation is completed to isolate a region where the supporting operation is not completed from a region where the supporting operation is completed, and the new tunnel is subjected to extraction ventilation.

The excavating device 1 is able to excavate one or more row pitches to the surrounding rock to form the new tunnel. Optionally, the excavating device 1 includes a body, and the body is provided with a cutting part, a first mechanical arm and a second mechanical arm. The cutting part is configured to cut the surrounding rock.

Optionally, the excavating device 1 may include a partial-size tunneling machine or a full-section tunnel boring machine. The partial-size tunneling machine may include horizontal-axis tunneling machine and a vertical-axis tunneling machine.

Broken coal and rock will produce when a new tunnel is excavated by the excavating device 1, which can be transported out by the transportation device 2 following the excavating device 1. The type of the transportation device 2 is not limited in the present disclosure, which can be determined as required. Optionally, the transportation device 2 may employ a travelling belt.

Further, the spraying device 5 sprays the coating material onto the surface of the new tunnel to form a coat with high gas tightness. As a possible implementation, the coating material has an adhesive property and a sealing property both meeting preset conditions, and the sealing coat formed by the coating material after the spraying has a tensile strength and a toughness needed for supporting.

Optionally, the spraying device 5 is disposed on the first mechanical arm, and the first mechanical arm can control the spraying device 5 to spray the coating material onto the surface of the new tunnel to form a sealing coat on the surface of the surrounding rock.

Optionally, the spraying device 5 includes: a third mechanical arm, a spraying assembly and a driving assembly. The third mechanical arm is disposed on the body of the excavating device or on a body of the spraying device. That is, the spraying device may be mounted on the excavating device, or may be an independent device.

The spraying assembly has a spraying end connected to the third mechanical arm.

The driving component is disposed on the body of the spraying device and connected to the third mechanical arm, and configured to drive the third mechanical arm to enable the spraying end to spray the coating material onto the surface of the new tunnel to form the sealing coat.

Optionally, the spraying assembly includes: a spraying head, a storage area for storing the coating material, a pumping equipment, and a transporting pipeline connecting the spraying head with the storage area. The spraying head is configured as the spraying end of the spraying assembly and connected to the third mechanical arm.

The pumping equipment is configured to pump the coating material from the storage area to the spraying head via the transporting pipeline for spraying out through the spraying head.

In the present disclosure, the pumping equipment and the storage area are optionally fixed in or on the body of the excavating device. Optionally, if the spraying device is a separate device, the pumping equipment and the storage area may also be disposed in the body of the spraying device. One end of the transporting pipeline is connected to the spraying head, and the other end of the transporting pipeline is connected to a discharge port of the storage area. Optionally, the transporting pipeline may also be arranged separately, and the end of the transporting pipeline connected to the spraying head may also be arranged in the third mechanical arm and connected to the spraying head through the third mechanical arm. Further, the spraying head is connected to the third mechanical arm through a rotating member and is rotatable in any direction around the third mechanical arm through the rotating member.

Further, the spraying head includes one or more nozzles with different spraying directions.

During the spraying, the spraying device can acquire a coating quality of a region to be sprayed, and adjust a spraying angle according to the coating quality. For example, the coating quality may be that the coat is uneven, and in order to make the coat on the surface of the surrounding rock uniform, it is necessary to adjust the spraying angle according to the current coating quality.

When an uneven sprayed position or an unsprayed position is identified, optionally, the rotating member may be driven to rotate to adjust the spraying head of the spraying device to face the uneven sprayed position or the unsprayed position, and then perform the spraying. Alternatively, it is also feasible to determine the nozzle facing the uneven sprayed position or the unsprayed position, control the nozzle facing such position to open and other nozzles in other directions to close, and then perform the spraying.

In the present disclosure, after the sealing coat is formed, in order to make the tunnel safer, bolts may be inserted into the new tunnel by a rock bolting jumbo 8. The rock bolting jumbo 8 may follow the excavating device 1 to move forward, and the rock bolting jumbo 8 can insert roof bolts into a top of the new tunnel and insert rib bolts into two sidewalls of the new tunnel to form permanent support.

The method for temporary coating supporting and permanent bolt supporting according to the present disclosure can support the surrounding rock, without using roadheader loaded roof or self-moving shield, which reduces the time-consuming and increases the supportable area of the tunnel, and meets the needs of rapid excavation of the coal mine tunnel. In addition, the tunnel can be supported by the method according to the present disclosure, without using manual transportation, which reduces the labor intensity and improves the supporting efficiency. Further, the tunnel can be permanently supported by inserting bolts therein, so as to provide safer working conditions for coal mining.

Figure 4:
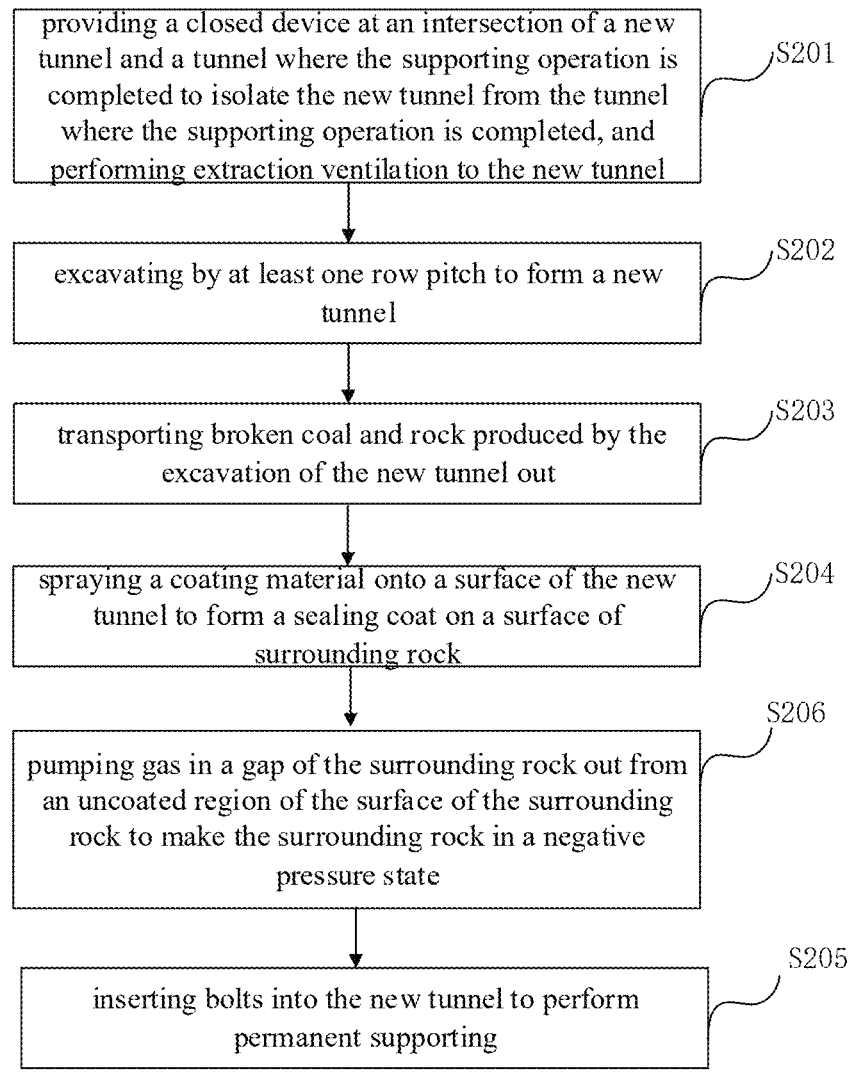
FIG. 4 is a flow chart of a method for temporary coating supporting and permanent bolt supporting provided in an embodiment of the present disclosure.

FIG. 4 is a flow chart of a method for temporary coating supporting and permanent bolt supporting provided in an embodiment of the present disclosure. On the basis of the above embodiments, as shown in FIG. 4, the method further includes a step S206 between the step S204 and the step S205.

In the step S206, gas in a gap of the surrounding rock is pumped out from an uncoated region of the surface of the surrounding rock to make the surrounding rock in a negative pressure state, so that supporting is formed by the sealing coat under the negative pressure state.

In embodiments of the present disclosure, the uncoated region may be reserved when the coating material is sprayed onto the surface of the surrounding rock. From this uncoated region, the gas in the gap of the surrounding rock can be pumped out. In embodiments of the present disclosure, the gas in the gap of the surrounding rock is pumped out from the uncoated region of the surface of the surrounding rock by a vacuum pumping subsystem. The vacuum pumping subsystem includes a vacuum generating device, a vacuum suction head, and an air extraction path connecting the vacuum generating device and the vacuum suction head. The vacuum generating device includes but is not limited to a vacuum generator and a vacuum pump.

Figure 6:
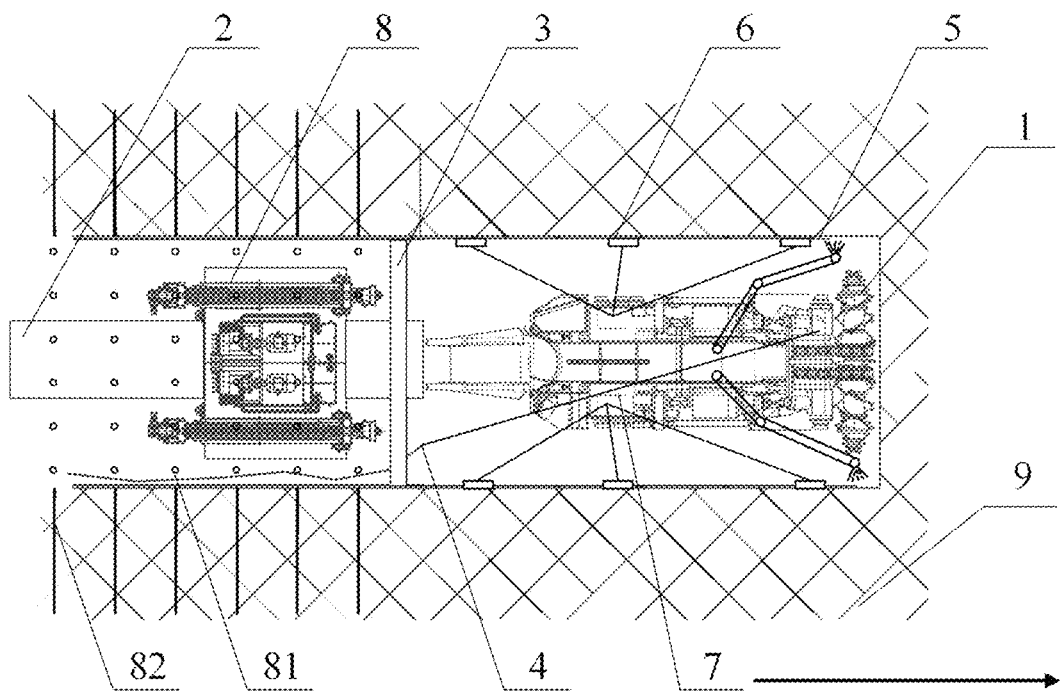
FIG. 6 is a spatial top view of a system for temporary coating supporting and permanent bolt supporting provided in an embodiment of the present disclosure.

As shown in FIG. 6, a system for temporary coating supporting and permanent bolt supporting is provided, which includes an excavating device 1, a closed device 3, a ventilation pipeline 4, a spraying device 5, a vacuum suction head 6, and a vacuum generating device 7. The vacuum suction head 6 and the vacuum generating device 7 constitute the vacuum pumping subsystem.

It should be noted that, as it is not necessary to pump the gas from the sealing coat in the method for temporary coating supporting and permanent bolt supporting as shown in FIG. 1 to FIG. 3, so it is not necessary to include the vacuum generating device 7 and the vacuum suction head 6 in the system as shown in FIG. 5.

In the system as shown in FIG. 6, the vacuum generating device 7 cooperates with the vacuum suction head 6 to pump out the internal gas of the surrounding rock 9, so as to generate a pressure difference on the surface of the tunnel, thereby achieving an active supporting of the surrounding rock 9 of the tunnel. In embodiments of the present disclosure, a maximum value of the pressure difference can reach one atmospheric pressure, i.e., 0.1 MPa, so as to achieving firm supporting of the surrounding rock 9.

In the following, a working principle of the gas extraction process will be illustrated.

The vacuum generating device 7 is connected to the vacuum suction head 6, and the vacuum suction head 6 can be lifted to the uncoated region by the second mechanical arm provided on the body of the excavating device. The vacuum suction head 6 is quickly attached to the uncoated region on the surface of the surrounding rock, and the vacuum suction head 6 and the sealing coat are sealed with each other, so as to quickly seal the surface of the surrounding rock and form a working environment for the air extraction. The gas inside the surrounding rock is continuously pumped out through the vacuum generating device 7 to generate a negative pressure, thereby realizing the supporting effect.

The air extraction process may be implemented as a process A. In the process A, the vacuum generating device 7 is connected with the vacuum suction head 6, and air in cracks on the surface of the surrounding rock is pumped out by the vacuum generating device 7 to make the surface of the surrounding rock in a negative pressure state and form a pressure difference P on the surface of a shallow part of the surrounding rock, where $0<P\leq 0.1$ MPa, thereby forming the active temporary supporting. During this process, the vacuum generating device 7 is always connected with the vacuum suction head 6 and continuously extracts the air until the end of construction.

The air extraction process may be implemented as a process B. In the process B, the vacuum generating device 7 is connected with the vacuum suction head 6, and the air in cracks on the surface of the surrounding rock is pumped out by the vacuum generating device 7 to make the surface of the surrounding rock in a negative pressure state and form a pressure difference P on the surface of a shallow part of the surrounding rock, where $0<P\leq 0.1$ MPa, thereby forming the active temporary supporting. During this process, when the pressure difference P reaches 0.1 MPa, the vacuum generating device 7 is quickly disconnected from the vacuum suction head 6, and the negative pressure is maintained by a one-way valve in the vacuum suction head 6 until the end of construction. In embodiments of the present disclosure, the air extraction process can adopt the process A or the process B, which is not limited herein.

In embodiments of the present disclosure, the system for temporary coating supporting and permanent bolt supporting may include one or more vacuum suction heads 6, each of which is connected to the vacuum generating device 7.

In the method for temporary coating supporting and permanent bolt supporting as shown in FIG. 4, by automatically extracting the gas in the gap of the surrounding rock to generate the negative pressure inside the surrounding rock, so that the newly formed channel can be effectively supported by atmospheric pressure, thereby realizing front excavation and rear supporting through simple processes. Furthermore, by taking advantage of the negative pressure generated by the air extraction process after the sealing coat is formed, the surrounding rock can be supported without using roadheader loaded roof or self-moving shield, which reduces the time-consuming and increases the supportable area of the tunnel, and meets the needs of rapid excavation of the coal mine tunnel. In addition, the tunnel can be supported by the method according to the present disclosure, without using manual transportation, which reduces the labor intensity and improves the supporting efficiency. Further, the tunnel can be permanently supported by inserting bolts therein, so as to provide safer working conditions for coal mining.

The sealing coat may be formed by spraying through the following manners, and specific spraying processes will be illustrated below.

Figure 7:
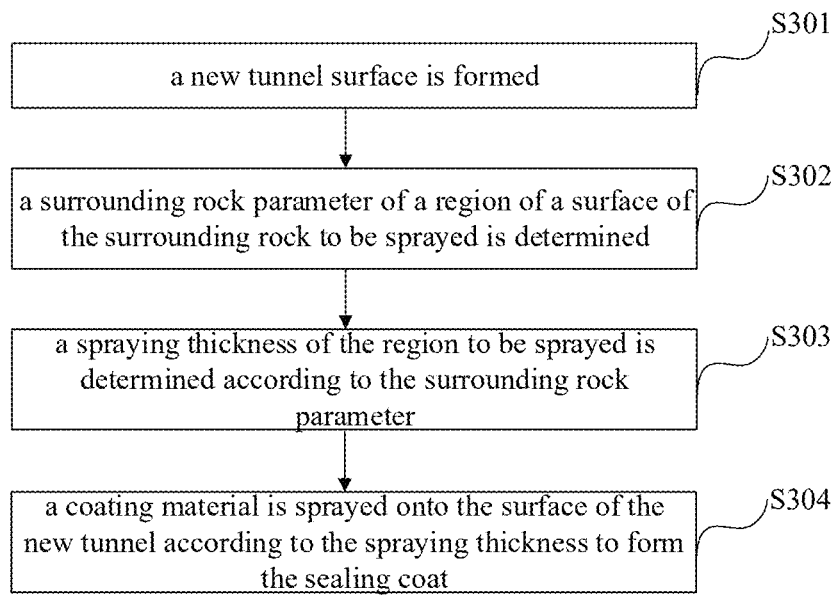
FIG. 7 is a flow chart of a method for temporary coating supporting and permanent bolt supporting provided in an embodiment of the present disclosure.

In a possible embodiment of the present disclosure, the coating material is only composed of one kind of material. FIG. 7 is a flow chart of a method for temporary coating supporting and permanent bolt supporting provided in an embodiment of the present disclosure.

At S301, a new tunnel surface is formed.

At S302, a surrounding rock parameter of a region of a surface of the surrounding rock to be sprayed is determined.

The surrounding rock parameter includes at least one selected from: flatness of the region to be sprayed and a gap parameter of the region to be sprayed; and the gap parameter of the region to be sprayed includes at least one selected from: the number of gaps, gap size and gap depth.

At S303, a spraying thickness of the region to be sprayed is determined according to the surrounding rock parameter.

As a possible implementation, the surface of the new tunnel is divided into N (N being greater than 1) regions to be sprayed. For each region to be sprayed, an image is obtained by an camera (such as a 360° rotatable camera) installed on the excavating device, and the flatness, the number of gaps, the gap size and the gap depth of the region are acquired according to the image, and then the spraying thickness of the region is determined.

At S304, the coating material is sprayed onto the surface of the new tunnel according to the spraying thickness to form the sealing coat.

The spraying device (such as the spraying device 5 as shown in FIG. 5 and FIG. 6) is a separate device or is mounted on the excavating device. The spraying device is able to spray the coating material onto the surface of the surrounding rock (such as the surrounding rock 9 as shown in FIG. 5 and FIG. 6) on the tunnel surface according to the spraying thickness to form the sealing coat. In the present disclosure, the sealing coat that can be formed by spraying the coating material onto the surface of the surrounding rock can prevent the rib spalling and play a protective role similar to that played by a metal mesh in bolt-cable supporting, and the sealing coat formed by the coating material after the spraying has a tensile strength and a toughness needed for supporting.

Figure 8:
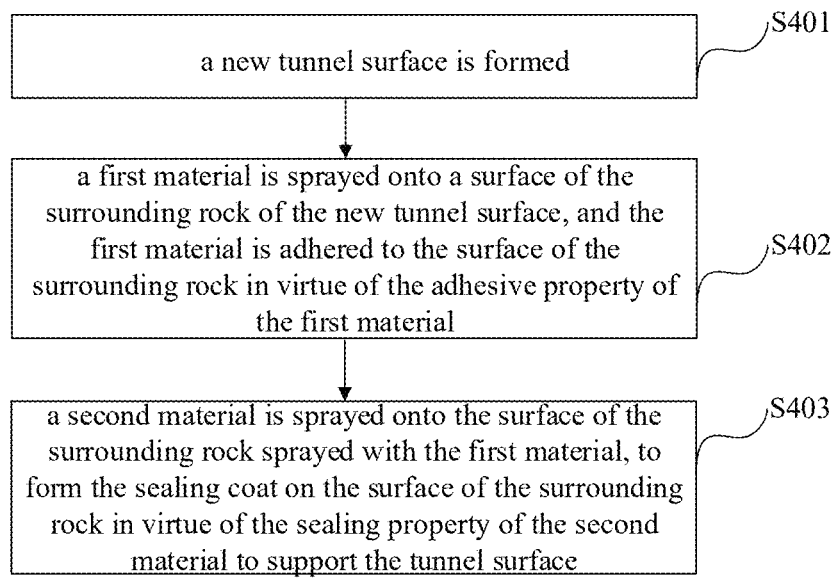
FIG. 8 is a flow chart of a method for temporary coating supporting and permanent bolt supporting provided in an embodiment of the present disclosure.

In another possible embodiment of the present disclosure, the coating materials includes two kinds of materials. FIG. 8 is a flow chart of a method for temporary coating supporting and permanent bolt supporting provided in an embodiment of the present disclosure.

As shown in FIG. 8, the method for temporary coating supporting and permanent bolt supporting according to embodiments of the present disclosure includes the following steps.

At S401, a new tunnel surface is formed.

At S402, a first material is sprayed onto a surface of the surrounding rock of the new tunnel surface, and the first material is adhered to the surface of the surrounding rock in virtue of the adhesive property of the first material.

The first material has an adhesive property meeting a preset condition, and the sealing coat that can be formed by spraying the first material onto the surface of the surrounding rock can prevent the rib spalling and play a protective role similar to that played by a metal mesh in bolt-cable supporting. For example, within 180 seconds after completion of the spraying, the sealing coat formed by spraying the first material has the following adhesive properties: a tensile strength>3 MPa, an adhesive strength>1 MPa, a shear strength>5 MPa, an elongation>60%, and a compressive strength>10 MP.

For example, the first material may be a foaming material, and the foaming material will expand in volume when in contact with water and fill the surface of the surrounding rock of the uneven tunnel surface of the coal and rock mass to achieve good adhesion with the coal and rock mass. As the primary coating material, the first material is sprayed onto the surface of the surrounding rock of the tunnel surface.

At S403, a second material is sprayed onto the surface of the surrounding rock sprayed with the first material, to form the sealing coat on the surface of the surrounding rock in virtue of the sealing property of the second material to support the tunnel surface.

The second material has a sealing property meeting a preset condition, and the formed sealing coat has a tensile strength and a toughness needed for supporting. Optionally, the coating material finally has a tensile strength of >3.5 MPa, a shear strength of >6 MPa, an elongation of >30%, and a compressive strength of >20 MPa.

For example, the second material may be an airtight thin spray material, which has good tensile property. The second material, as a secondary coating material, is sprayed onto the surface of the primary coating material to form an airtight thin layer.

Optionally, after the second material is sprayed and the reaction among the material is completed, the formed sealing coat does not react with water. That is, the coating material in the sealing coat will not continue expanding when subjected to water, and keep the compressive strength, the shear strength and the tensile strength not decreased, so that the supporting effect of the sealing coat will not decrease when the sealing coat is subjected to water, thereby avoiding the occurrence of accidents.

It can be understood that, both the first material and the second material may be organic materials. When the first material and the second material are organic materials, each of them has a flash point of ≥200° C. and an oxygen index of ≤35%, so as to avoid fire hazard and thus reduce the probability of serious safety accidents. Both the first material and the second material may also be inorganic materials. For environmental protection requirements, the first material and the second material need to be non-toxic, odorless and pollution-free materials. The usage environment temperature of the first material and the second material is generally within the range from 0 to 40° C. Optionally, the first material and the second material each have a maximum reaction temperature of ≤90° C.

Optionally, the first material and the second material each have a flame retardant property and an antistatic property.

It should be illustrated that, the present disclosure is mainly aimed at the supporting process, and other coating materials with similar functions to the first material and the second material may also be used in the present disclosure.

In the method for temporary coating supporting and permanent bolt supporting according to embodiments of the present disclosure, a new tunnel surface is excavated first, then the first material is sprayed onto the surface of the surrounding rock of the new tunnel surface, and the first material is adhered to the surface of the surrounding rock in virtue of the adhesive property of the first material, after which the second material is sprayed onto the surface of the surrounding rock sprayed with the first material to form the sealing coat on the surface of the surrounding rock in virtue of the sealing property of the second material. In this way, effective supporting is formed, unsupported roof distance and unsupported sidewall distance are reduced, repeated transposition of the excavating device and the supporting device is avoided, front excavation and rear supporting are realized, and the process is simple, which significantly speeds up the formation of coal tunnel, improves the efficiency, and alleviates the continuity problem between the tunnel excavation and coal mining.

Figure 9:
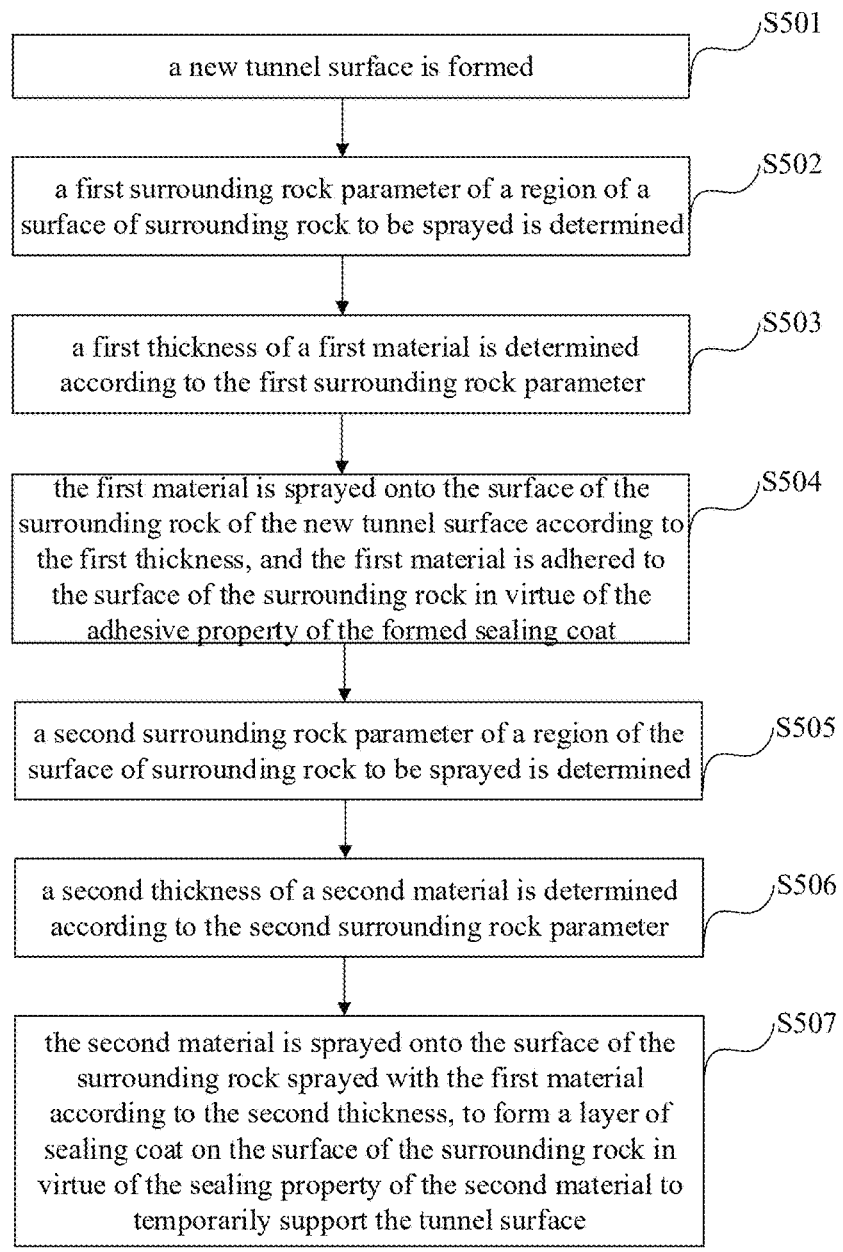
FIG. 9 is a flow chart of a method for temporary coating supporting and permanent bolt supporting provided in an embodiment of the present disclosure.

FIG. 9 is a flow chart of a method for temporary coating supporting and permanent bolt supporting according to an embodiment of the present disclosure. As shown in FIG. 9, the method for temporary coating supporting and permanent bolt supporting according to embodiments of the present disclosure includes the following steps.

At S501, a new tunnel surface is formed.

At S502, a first surrounding rock parameter of a region of a surface of surrounding rock to be sprayed is determined.

The first surrounding rock parameter includes at least one selected from: flatness of the region to be sprayed and a gap parameter of the region to be sprayed; and the gap parameter of the region to be sprayed includes at least one selected from: the number of gaps, gap size and gap depth.

At S503, a first thickness of a first material is determined according to the first surrounding rock parameter.

At S504, the first material is sprayed onto the surface of the surrounding rock of the new tunnel surface according to the first thickness, and the first material is adhered to the surface of the surrounding rock in virtue of the adhesive property of the formed sealing coat.

As a possible implementation, the new tunnel surface is divided into N (N being greater than 1) regions to be sprayed. For each region to be sprayed, an image is obtained by an camera (such as a 360° rotatable camera) installed on the excavating device, and the flatness, the number of gaps, the gap size and the gap depth of the region are acquired according to the image, the first thickness of the first material to be sprayed onto the region is determined, and the first material of the first thickness is sprayed onto the region.

In this way, each region to be sprayed can be specifically treated, so that the first material can be better adhered to the surface of the surrounding rock.

At S505, a second surrounding rock parameter of a region of the surface of surrounding rock to be sprayed is determined.

The second surrounding rock parameter includes at least one selected from: flatness of the region to be sprayed and a gap parameter of the region to be sprayed; and the gap parameter of the region to be sprayed includes at least one selected from: the number of gaps, gap size and gap depth.

At S506, a second thickness of a second material is determined according to the second surrounding rock parameter.

At S507, the second material is sprayed onto the surface of the surrounding rock sprayed with the first material according to the second thickness, to form a layer of sealing coat on the surface of the surrounding rock in virtue of the sealing property of the second material to support the tunnel surface.

As a possible implementation, the new tunnel surface sprayed with the first material may be divided into N regions to be sprayed. For each region to be sprayed, an image is obtained by an camera (such as a 360° rotatable camera) installed on the excavating device 1, and the flatness, the number of gaps, the gap size and the gap depth of the region are acquired according to the image, the second thickness of the second material to be sprayed onto the region is determined, and the second material of the second thickness is sprayed onto the region sprayed with the first material. In this way, each region to be sprayed can be specifically treated, so that the sealing layer formed by the second material on the surface of the surrounding rock has better quality and sealing property, and enhances the supporting intensity on the tunnel surface.

Figure 10:
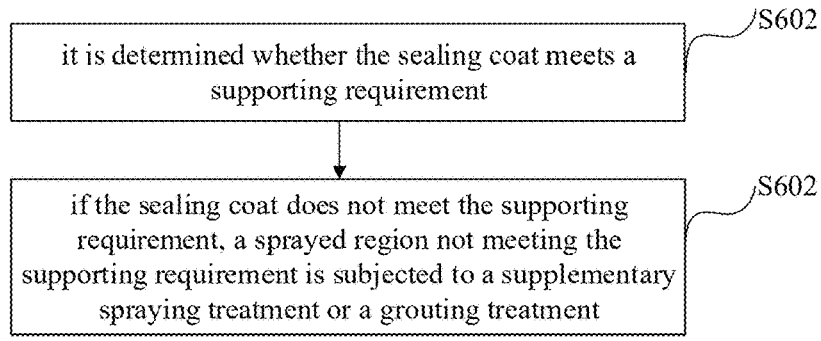
FIG. 10 is a flow chart of a method for temporary coating supporting and permanent bolt supporting provided in an embodiment of the present disclosure.

For further improving the quality and sealing property of the sealing coat and enhancing the supporting intensity of the sealing coat on the tunnel surface, the method further includes the following steps after the sealing coat is formed, as shown in FIG. 10.

At S601, it is determined whether the sealing coat meets a supporting requirement.

At S602, if the sealing coat does not meet the supporting requirement, a sprayed region not meeting the supporting requirement is subjected to a supplementary spraying treatment or a grouting treatment.

The supporting requirement include at least one of the following requirements: the thickness of the sealing coat reaches a preset thickness threshold, the spraying is uniform, that is, there is no abnormal spraying area, and the air leakage is less than a preset air leakage threshold. The preset thickness threshold and the preset air leakage threshold may be set as required.

As an implementation for obtaining the thickness of the sealing coat, the image obtained in the step S601 is preprocessed to obtain the thickness of the sealing coat. Optionally, images of the surface of the surrounding rock can be collected before and after the spraying through an image sensor like a camera, and then the collected images are sent to a computer for image processing to obtain the thickness of the surrounding rock surface before and after the spraying.

As another implementation, the thickness of the sealing coat may be directly obtained through a three-dimensional laser scanner installed on the excavating device. Optionally, three-dimensional models and various map-building data (such as line data, surface data and volume data) before and after the spraying are quickly reconstructed based on three-dimensional coordinates, reflectivity, texture and other information of a large number of dense points on the surrounding rock surface before and after the spraying obtained through three-dimensional laser scanning and in accordance with the principle of laser ranging, so as to obtain the thickness of the surrounding rock surface before and after the spraying.

Optionally, the obtained thickness of the sealing coat may be compared with the preset thickness threshold, and if the thickness of the sealing coat is identified to be lower than the thickness threshold, it is determined that the sealing coat does not meet the support requirement; if the thickness of the sealing coat is identified to be higher than or equal to the thickness threshold, it is determined that the sealing coat meets the support requirements.

Optionally, whether there is an abnormal spraying area in the sealing coat can be identified according to the RGB pattern image of the sealing coat. The abnormal spraying area includes an unsprayed area and an uneven sprayed area.

That is to say, in this embodiment, the thickness and the air leakage of the sealing coat are obtained first, and then it is determined whether the thickness reaches the preset thickness threshold, whether the air leakage is less than the preset air leakage threshold, or whether there is an abnormal spraying area, if any one of these conditions is not met, it is determined that the sealing coat does not meet the support requirement.

When the coating material is composed of one kind of material, the sprayed region not meeting the supporting requirement continues to be sprayed with such coating material or is subjected to a grouting treatment.

When the coating material includes two kinds of materials, namely the first material and the second material are combined for spraying, the sprayed region not meeting the supporting requirement continues to be sprayed with the second material (partial supplementary spraying), or the sprayed region not meeting the supporting requirement is further grouted with the second material (i.e., local grouting), until the thickness and the air leakage of the sealing coat both meet the requirements, so as to further improve the quality and sealing property of the sealing coat and enhancing the supporting intensity of the sealing coat on the tunnel surface.

Figure 11:
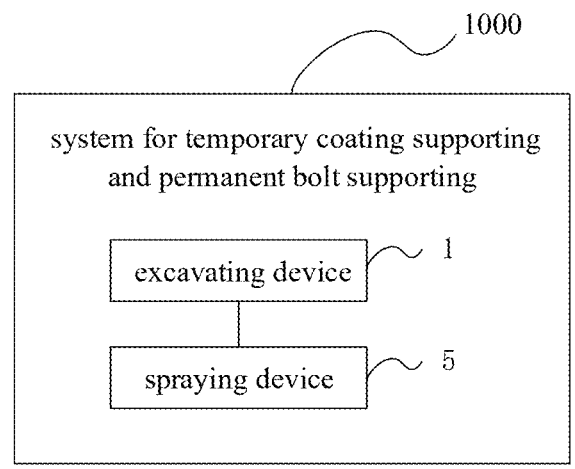
FIG. 11 is a block diagram of a system for temporary coating supporting and permanent bolt supporting provided in an embodiment of the present disclosure.

FIG. 11 is a block diagram of a system for temporary coating supporting and permanent bolt supporting provided according to embodiments of the present disclosure. As shown in FIG. 11, the system 1000 for temporary coating supporting and permanent bolt supporting according to embodiments of the present disclosure includes: an excavating device 1 and a spraying device 5.

The excavating device 1 is configured to excavate by at least one row pitch to form a new tunnel.

The spraying device 5 is configured to spray a coating material onto a surface of the new tunnel to form a sealing coat on a surface of surrounding rock. The coating material has an adhesive property and a sealing property both meeting preset conditions, and the formed sealing coat has a tensile strength and a toughness needed for supporting.

Figure 12:
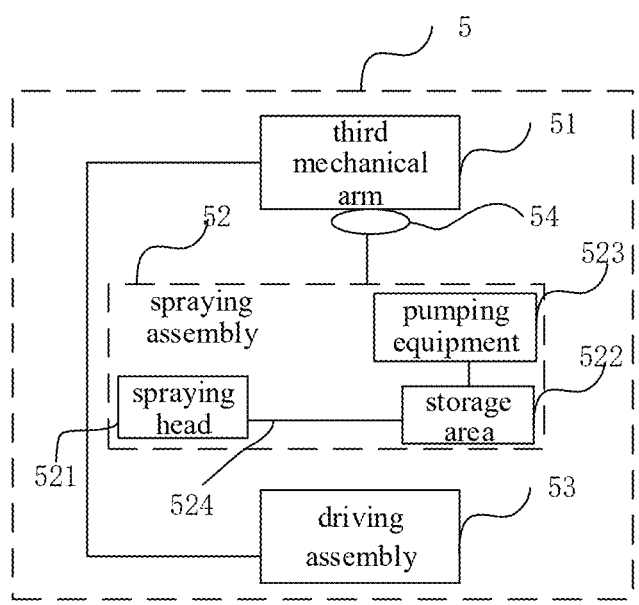
FIG. 12 is a block diagram of a spraying device provided in an embodiment of the present disclosure.
Figure 13:
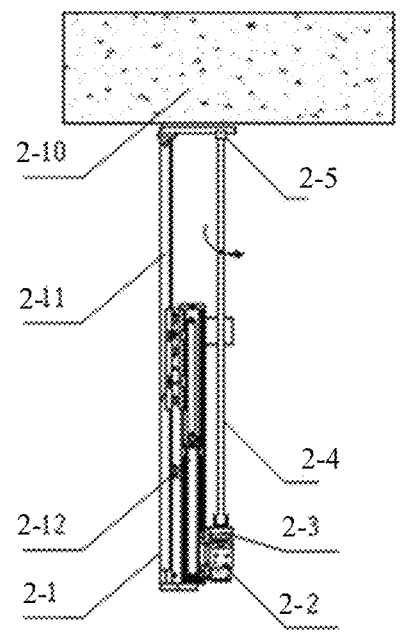
FIG. 13 is a schematic diagram of a bolt supporting device for drilling, grouting, anchoring and pre-tightening according to an embodiment of the present disclosure.
Figure 14:
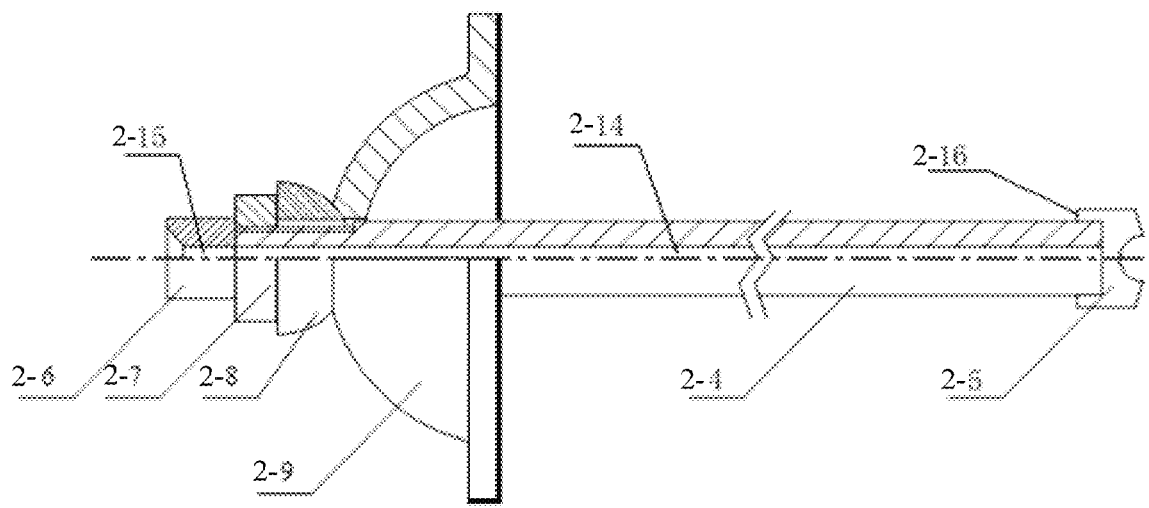
FIG. 14 is a schematic diagram of a bolt mechanism of a bolt supporting device according to an embodiment of the present disclosure.
Figure 15:
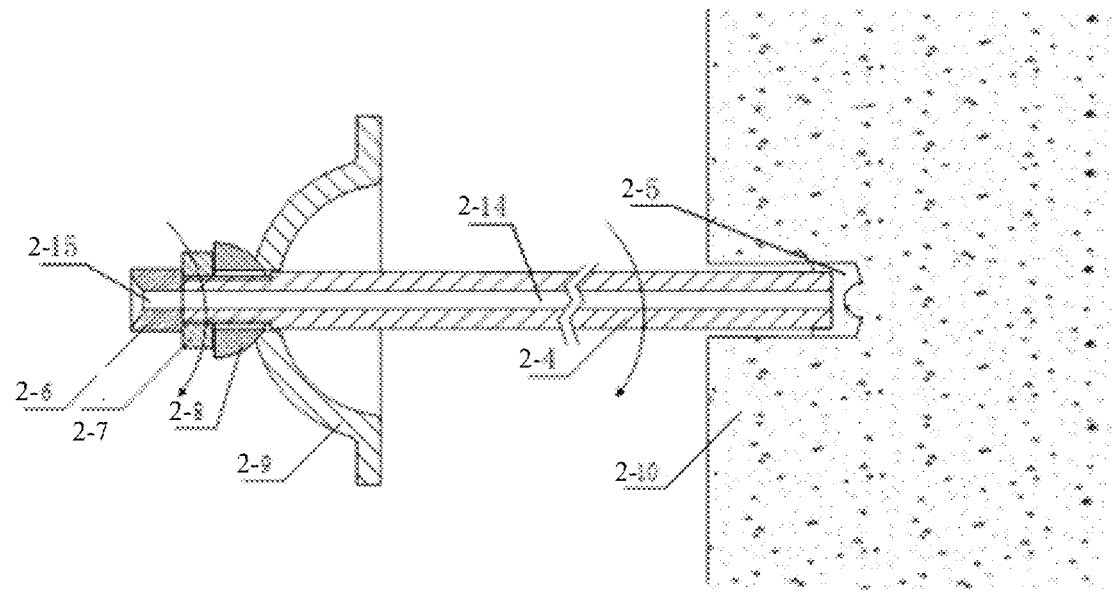
FIG. 15 is a schematic diagram of a bolt mechanism of a bolt supporting device in a drilling process according to an embodiment of the present disclosure.
Figure 16:
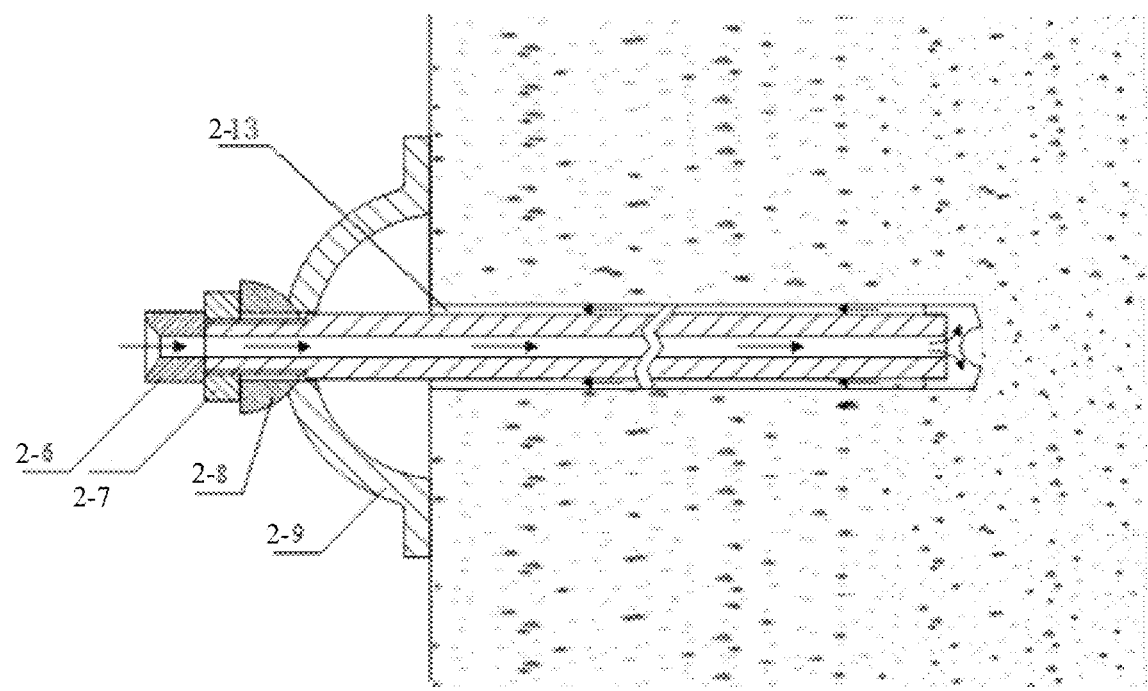
FIG. 16 is a schematic diagram of a bolt mechanism of a bolt supporting device in a grouting process according to an embodiment of the present disclosure.
Figure 17:
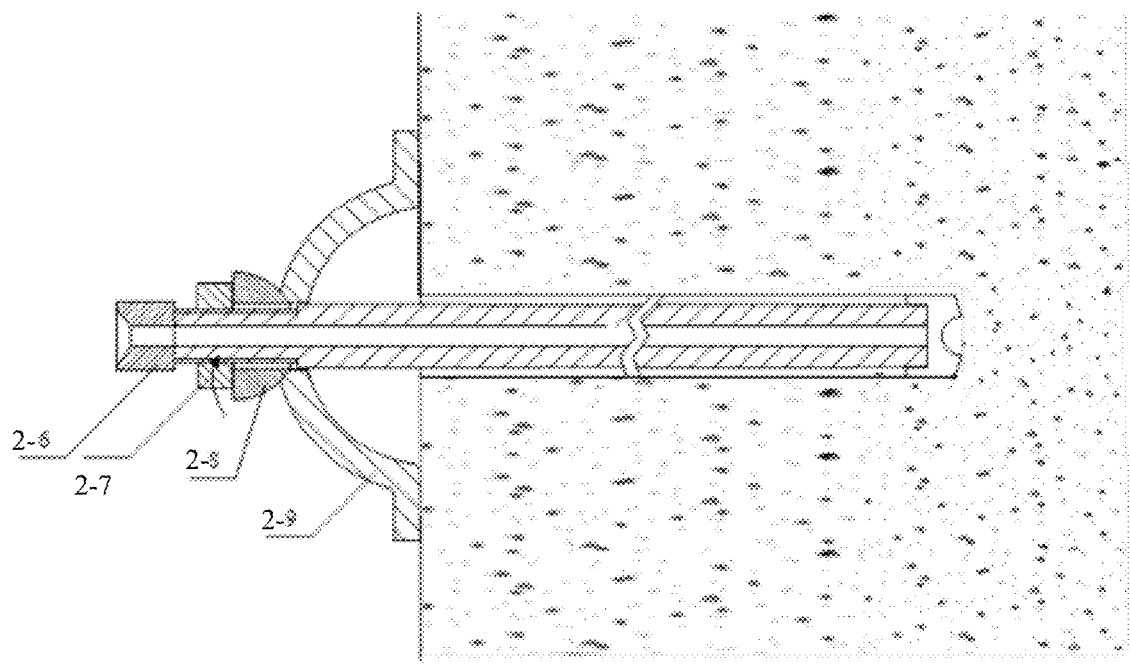
FIG. 17 is a schematic diagram of a bolt mechanism of a bolt supporting device in a pre-tightening process according to an embodiment of the present disclosure.

Further, as shown in FIG. 12, the spraying device 5 includes: a third mechanical arm 51, a spraying assembly 52 and a driving assembly 53.

The third mechanical arm 51 is disposed on a body.

The spraying assembly 52 is connected to the third mechanical arm 51, and the spraying assembly 52 includes a storage area for storing the coating material.

The driving assembly 53 is disposed on the body and connected to the third mechanical arm 51, and the driving assembly 53 is configured to drive the third mechanical arm 51 to enable a spraying end of the spraying assembly 52 to spray the coating material onto the surface of the new tunnel to form the sealing coat.

Further, the spraying assembly 52 includes: a spraying head 521, a storage area 522, a pumping equipment 523, and a transporting pipeline 524 connecting the spraying head with the storage area.

The spraying head 521 is configured as the spraying end of the spraying assembly 52 and connected to the third mechanical arm 51.

The pumping equipment 523 is configured to pump the coating material from the storage area 522 to the spraying head 521 via the transporting pipeline 524 for spraying out through the spraying head 521.

Further, the spraying head 521 includes one or more nozzles with different spraying directions. Optionally, the spraying head 521 is connected to the third mechanical arm 51 through a rotating member 54, and the spraying assembly 52 is rotatable in any direction around the third mechanical arm 51 through the rotating member 54.

The system according to embodiments of the present disclosure can effectively support the newly formed tunnel by spraying the coat thereon, and can realize front excavation and rear supporting through simple processes. The surrounding rock can be supported by the system according to the present disclosure, without using roadheader loaded roof or self-moving shield, which reduces the time-consuming and increases the supportable area of the tunnel, and meets the needs of rapid excavation of the coal mine tunnel. In addition, the tunnel can be supported by the system according to the present disclosure, without using manual transportation, which reduces the labor intensity and improves the supporting efficiency.

As shown in FIG. 13 to FIG. 17, embodiments of the present disclosure provide a bolt supporting device for drilling, grouting, anchoring and pre-tightening operations. The bolt supporting device includes: a bolt mechanism, including a bolt 2-4 having a grouting channel 2-14 therein in a length direction thereof; a driving mechanism, connected to the bolt mechanism and configured to drive the bolt 2-4 to rotate to perform drilling and pre-tightening operations; a grouting mechanism, connected to the grouting channel 2-14 and configured to grout the grouting channel 2-14; and an advancing mechanism, connected to the driving mechanism and configured to advance the bolt 2-4 to drill. It can be understood that the bolt mechanism is a structure that integrates a drilling function, a grouting function and a pre-tightening function; the driving mechanism is configured to provide driving force for the drilling and pre-tightening operations of the bolt mechanism; the grouting mechanism is configured to inject slurry into the drilled hole through the bolt mechanism to realize the anchoring effects; and the advancing mechanism is configured to provide an advancing force for the bolt mechanism during the drilling process.

Specifically, the bolt mechanism includes the bolt 2-4, the bolt 2-4 has a grouting channel 2-14 therein in the length direction thereof, and the grouting channel 2-14 is preferably cylindrical and configured to allow the slurry to flow from a tail end of the bolt 2-4 to a top end of the bolt 2-4 and to be injected into the drilled hole 2-13, so as to realize the anchoring effect. The driving mechanism has an output end connected to the tail end of the bolt 2-4, and is configured to drive the bolt 2-4 to rotate in different directions to realize the drilling operation and the pre-tightening operation, respectively. The grouting mechanism is connected to the tail end of the bolt 2-4, and configured to grout the grouting channel 2-14 after the drilling operation is completed by the bolt 2-4, and the slurry finally flows into the drilled hole 2-13 to realize the anchoring operation. The advancing mechanism has a driving end connected to the tail end of the bolt 2-4, and is configured to advance the bolt 2-4 to drill by a drilling depth in a drilling direction during the drilling operation of the bolt 2-4.

In an embodiment of the present disclosure, the bolt 2-4 is provided with a drilling bit 2-5 at a first end thereof, and the drilling bit 2-5 is provided with a grout outlet 2-16 communicated with the grouting channel 2-14. It can be understood that the first end (i.e., the top end) of the bolt 2-4 is provided with the drilling bit 2-5, and the drilling bit 2-5 is fixedly connected to the bolt 2-4, so as to keep synchronous rotation. The rotation of the drilling bit 2-5 acts on the surrounding rock 2-10 to realize the drilling operation.

Further, the drilling bit 2-5 is provided with the grout outlet 2-16 communicated with the grouting channel 2-14, so as to realize the communication between the grouting channel 2-14 and the drilled hole 2-13. The drilling bit 2-5 is of a hollow structure and is sleeved on the top end of the bolt 2-4, an inner diameter of the drilling bit 2-5 is larger than that of the grouting channel 2-14, and outer diameter of the drilling bit 2-5 is larger than that of the bolt 2-4. An axis of the drilling bit 2-5 coincides with that of the bolt 2-4, the grout outlet 2-16 is disposed at a side of the axis of the drilling bit 2-5, and a flow direction of the slurry in the grout outlet 2-16 is from the top end of the bolt 2-4 to the tail end of the bolt 2-4. That is to say, the slurry is injected by the grouting mechanism into the grouting channel 2-14 from the tail end of the bolt 2-4, and flows into the drilling bit 2-5, and further flows into a bottom of the drilled hole 2-13 through the grout outlet 2-16. The slurry flows from the bottom of the drilled hole 2-13 to a starting part to achieve the anchoring.

In an embodiment of the present disclosure, the bolt 2-4 is provided at a second end thereof with a limiting block 2-6, a pre-tightening nut 2-7, a self-aligning ball gasket 2-8 and a tray 2-9 in sequence in a direction from the second end to the first end of the bolt 2-4, and the second end of the bolt 2-4 has a screw thread fitted with the pre-tightening nut 2-7. It can be understood that the second end (i.e., the tail end) of the bolt 2-4 is provided with the limiting block 2-6, the pre-tightening nut 2-7, the self-aligning ball gasket 2-8 and the tray 2-9, and the limiting block 2-6, the pre-tightening nut 2-7, the self-aligning ball gasket 2-8 and the tray 2-9 are arranged in sequence in the direction from the second end to the first end of the bolt 2-4 (i.e., the drilling direction), and all of the them are coaxial with the bolt 2-4.

Specifically, the tray 2-9 is sleeved on the bolt 2-4, and the self-aligning ball gasket 2-8 is sleeved on the bolt 2-4 and is fitted with the tray 2-9. The pre-tightening nut 2-7 is fitted with the screw thread at the second end of the bolt 2-4 and serves as a transmission part of the rotational power. That is to say, the driving mechanism acts on the pre-tightening nut 2-7, and the pre-tightening nut 2-7 drives the bolt 2-4 to rotate to realize drilling operation; the driving mechanism drives the pre-tightening nut 2-7 to rotate on its axis to generate pressure on the self-aligning ball gasket 2-8, the self-aligning ball gasket 2-8 acts on the tray 2-9, and the tray 2-9 is fitted with a wall of the surrounding rock 2-10 to realize the pre-tightening of the bolt 2-4.

The limiting block 2-6 is disposed at an end part of the second end of the bolt 2-4, and a size of the limiting block 2-6 in a direction perpendicular to an axis of the bolt 2-4 is greater than the inner diameter of the pre-tightening nut 2-7, but smaller than the outer diameter of the pre-tightening nut 2-7. That is to say, the limiting block 2-6 limits the rotation of the pre-tightening nut 2-7 towards the second end of the bolt 2-4, and prevents the pre-tightening nut 2-7 from disengaging from the bolt 2-4. It is worth noting that when the driving mechanism drives the pre-tightening nut 2-7 to move in a direction away from the drilling direction of the bolt 2-4, the limiting block 2-6 plays a limiting role on the pre-tightening nut 2-7 to prevent the pre-tightening nut 2-7 from disengaging from the bolt 2-4. At this time, the bolt 2-4 rotates together with the pre-tightening nut 2-7 to realize the drilling operation; when the driving mechanism drives the pre-tightening nut 2-7 to move along the drilling direction, the pre-tightening nut 2-7 rotates relative to the bolt 2-4 to generate pressure on the self-aligning ball gasket 2-8 and the tray 2-9 to achieve the pre-tightening operation.

In an embodiment of the present disclosure, the limiting block 2-6 is provided with a grouting through-hole 2-15 communicated with the grouting channel 2-14. It can be understood that the limiting block 2-6 is disposed at the end part of the tail end of the bolt 2-4, and keeps coaxial with the bolt 2-4. The limiting block 2-6 is provided with the grouting through-hole 2-15, and the grouting through-hole 2-15 is coaxial with the grouting channel 2-14 and communicated with the grouting channel 2-14, so that the grouting mechanism is communicated with the grouting channel 2-14 through the grouting through-hole 2-15, ensuring that the limiting block 2-6 plays a limiting role on the pre-tightening nut 2-7, without affecting the grouting.

In an embodiment of the present disclosure, the driving mechanism includes a driver 2-2, and an output end of the driver 2-2 is connected to the pre-tightening nut 2-7 for driving the pre-tightening nut 2-7 to rotate forwardly or reversely. It can be understood that the driving mechanism includes the driver 2-2, which is configured as a power outputting component for the drilling and pre-tightening operations. The output end of the driver 2-2 is connected to the pre-tightening nut 2-7. By adjusting the rotation direction of the output end of the driver 2-2, the pre-tightening nut 2-7 is driven to rotate forwardly or reversely.

Specifically, when the output end of the driver 2-2 drives the pre-tightening nut 2-7 to rotate reversely, i.e., to rotate counterclockwise, the pre-tightening nut 2-7 moves in the direction away from the drilling direction, and the pre-tightening nut 2-7 can no longer move in the direction away from the drilling direction when subjected to the limiting action of the limiting block 2-6. At this time, the bolt 2-4 and the pre-tightening nut 2-7 rotate counterclockwise synchronously to achieve the drilling operation; when the output end of the driver 2-2 drives the pre-tightening nut 2-7 to rotate forwardly, i.e., to rotate clockwise, the pre-tightening nut 2-7 moves along the drilling direction. At this time, the pre-tightening nut 2-7 rotates relative to the bolt 2-4, and generates pressure on the self-aligning ball gasket 2-8 and the tray 2-9 to make the tray 2-9 act on the sidewall of the surrounding rock 2-10 to achieve pre-tightening.

In an embodiment of the present disclosure, the driver 2-2 is an electric motor, an air cylinder, a hydraulic cylinder or an internal combustion engine. It can be understood that the driver 2-2, as a power outputting component for driving the rotation of the pre-tightening nut 2-7, is preferably an electric motor.

In an embodiment of the present disclosure, the grouting mechanism includes a grouting pump 2-3, and the grouting pump 2-3 has a grout conveying port connected to the grouting channel 2-14. It can be understood that the grouting pump 2-3 is configured to input the anchoring agent into the grouting channel 2-14, and further into the drilled hole 2-13 to realize anchoring. Specifically, the grouting pump 2-3 is fixedly installed at the output end of the driver 2-2, the pre-tightening nut 2-7 is slidably embedded in the output end of the grouting pump 2-3, and the grouting pump 2-3 rotates synchronously with the output end of the driver 2-2. The pre-tightening nut 2-7 is connected to a nut at the tail part of the bolt 2-4. During pre-tightening, since the bolt 2-4 is anchored, the driver 2-2 drives the pre-tightening nut 2-7 to rotate, while the bolt 2-4 is fixed, so as to realize the movement of the pre-tightening nut 2-7 towards the head of the bolt 2-4.

In an embodiment of the present disclosure, the advancing mechanism includes a base 2-1 and a drilling arm 2-12 disposed on the base 2-1, and an output end of the drilling arm 2-12 is connected to the drive mechanism for advancing the bolt 2-4 in the drilling direction. It can be understood that the advancing mechanism includes the base 2-1 and the drilling arm 2-12, the base 2-1 is a vertically arranged supporting plate, an end of the base 2-1 is in contact with the sidewall of the surrounding rock 2-10, and the sidewall of the surrounding rock 2-10 supports the base 2-1. The drilling arm 2-12 is fixedly installed on a vertical side of the base 2-1, and the output end of the drilling arm 2-12 is connected to the driver 2-2. That is, the output end of the drilling arm 2-12 advances the driver 2-2 in the drilling direction, and both the grouting pump 2-3 and the bolt 2-4 move synchronously with the driver 2-2. The drilling arm 2-12 outputs drilling power for the drilling operation of the bolt 2-4.

In an embodiment of the present disclosure, the base 2-1 is provided with a guide rail 2-11 arranged in the drilling direction, and the driving mechanism is slidably disposed on the guide rail 2-1. It can be understood that the guide rail 2-11 is disposed on the vertical side of the base 2-1 along the drilling direction, and the guide rail 2-11 is arranged on the same side as the drilling arm 2-12. The driver 2-2 is slidably disposed on the guide rail 2-11, and slides close to the surrounding rock 2-10 under the advancing action of the drilling arm 2-12. During the advancing process of the drilling arm 2-12, the guide rail 2-11 plays supporting and guiding roles on the bolt 2-4.

Embodiments of the present disclosure also provide a construction method of the bolt supporting device, which includes:
  driving the bolt 2-4 by the driving mechanism to rotate in a first direction, and advancing the bolt 2-4 by the advancing mechanism to drill to a preset depth;
  grouting a drilled hole 2-13 by the grouting mechanism to a preset anchoring length through the grouting channel; and
  driving the pre-tightening nut 2-7 of the bolt mechanism by the driving mechanism to rotate in a second direction and pre-tighten.

Embodiments of the present disclosure provide a construction method of the bolt supporting device for drilling, grouting, anchoring and pre-tightening operations. The construction method specifically includes the following steps.

Drilling operation on the surrounding rock 2-10, including that: a position to be drilled is selected on the sidewall of the surrounding rock 2-10 as required, the base plate is arranged at a corresponding position of the sidewall of the surrounding rock 2-10 to make the bolt 2-4 correspond to the to-be-drilled position; the driver 2-2 is turned on to reversely rotate counterclockwise to drive the grouting pump 2-3 and the pre-tightening nut 2-7 to rotate reversely, the pre-tightening nut 2-7 drives the bolt 2-4 to rotate reversely under the action of the limiting block 2-6, at this time, the pre-tightening nut 2-7 is static relative to the bolt 2-4; the output end of the drilling arm 2-12 advances the driver 2-2 to enable the bolt 2-4 to move forwards, and the drilling bit 2-5 is in contact with the surrounding rock 2-10 and drills the surrounding rock 2-10, the driver 2-2 stops working when the depth of the drilled hole 2-13 meets the construction requirement, and the drilling operation is completed.

Grouting and anchoring operations, including that: the grouting pump 2-3 is turned on, the anchoring agent is injected from the output end of the grouting pump 2-3 into the drilled hole 2-13 after passing through the grouting through-hole 2-15 of the limiting block 2-6, the grouting channel 2-14 and the grout outlet 2-16 in sequence, and flows from the bottom to the starting part of the drilled hole 2-13, the grouting pump 2-3 stops working when the anchoring length is reached, and the grouting and anchoring operations are completed.

Supporting and pre-tightening operations, including that: the driver 2-2 is turned on to forwardly rotate clockwise to drive the grouting pump 2-3 and the pre-tightening nut 2-7 to rotate forwardly, as the bolt 2-4 is anchored in the drilled hole 2-13 and is fixed connected with the surrounding rock 2-10, the pre-tightening nut 2-7 moves in the drilling direction and continuously press the self-aligning ball gasket 2-8, the tray 2-9 and the surrounding rock 2-10, when the pre-tightening force meets the construction requirement, the driver 2-2 stops working, and the pre-tightening operation is completed, and then the base plate, the driver 2-2 and the grouting pump 2-3 are disassembled to the next position to be drilled.

The one or more technical solutions as described in the above embodiments of the present disclosure have at least one of the following technical effects.

By providing the grouting channel 2-14 in the bolt 2-4, providing the driving mechanism to drive the bolt 2-4 to rotate, and providing the advancing mechanism to advance the bolt 2-4 to drill, the drilling operation on the surrounding rock 2-10 and the pre-tightening operation on the bolt 2-4 are achieved. The grouting mechanism grouts the drilled hole 2-13 through the grouting channel 2-14 to realize the anchoring effect of the bolt 2-4. As a result, the bolt supporting device integrates the drilling, grouting, anchoring and pre-tightening operations, and the bolt supporting device has a simple structure and simplified construction processes, and is easy to operate, which not only guarantees the supporting effect and improves the supporting efficiency, but also realizes the automatic operations.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", and "circumferential" should be construed to refer to the orientation or positional relationship as then described or as shown in the drawings under discussion. These relative terms are for convenience of description, but do not indicate or imply that the device or element referred to must have a particular orientation, or be constructed or operated in a particular orientation, and thus shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may explicitly or implicitly comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below;" "under," or "on bottom of" a second feature may include an embodiment in which the first feature is right or obliquely "below;" "under," or "on bottom of" the second feature, or just means that the first feature is at a height lower than that of the second feature.

Reference throughout this specification to "an embodiment", "one embodiment", "some embodiments", "another embodiment", "an example", "a specific example", or "some examples", means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another embodiment", "in an example", "in a specific example", or "in some examples", in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine different embodiments or examples described in this specification, or combine features of different embodiments or examples.

Although some embodiments have been shown and described above, it would be appreciated by those skilled in the art that the above embodiments are illustrative, and cannot be construed to limit the present disclosure, and changes, alternatives, modifications and variants can be made in the embodiments without departing from the scope of the present disclosure.

What is claimed is:

1. A method for temporary coating supporting and permanent bolt supporting, wherein tunnel excavation construction operation is composed of a plurality of operation cycle units, and each of the operation cycle units comprises:

excavating by at least one row pitch to form a new tunnel;

spraying a coating material onto a surface of the new tunnel to form a sealing coat on a surface of surrounding rock, wherein within 300 seconds after completion of the spraying, the sealing coat formed by the coating material has a tensile strength of >1 MPa, an adhesive strength of >0.5 MPa, a shear strength of >1 MPa, an elongation of >30%, and a compressive strength of >2 MPa, and the coating material finally has a tensile strength of >3 MPa, a shear strength of >4 MPa, an elongation of >30%, and a compressive strength of >20 MPa;

inserting bolts into the new tunnel to perform permanent supporting; and wherein each bolt has a grouting channel therein in a length direction thereof; wherein the bolt is provided with a drilling bit at a first end thereof, and the drilling bit is provided with a grout outlet communicated with the grouting channel, the bolt is provided at a second end thereof with a limiting block, a pre-tightening nut, a self-aligning ball gasket and a tray in sequence in a direction from the second end to the first end of the bolt, and the second end of the bolt has a screw thread fitted with the pre-tightening nut, and the limiting block is provided with a grouting through-hole communicated with the grouting channel.

2. The method according to claim 1, wherein spraying the coating material onto the surface of the new tunnel to form the sealing coat on the surface of the surrounding rock comprises:

determining a surrounding rock parameter of a region of the surface of the surrounding rock to be sprayed according to an image of the region of the surface of the surrounding rock to be sprayed obtained by a camera;

determining a spraying thickness of the region to be sprayed according to the surrounding rock parameter; and spraying the coating material onto the surface of the new tunnel according to the spraying thickness to form the sealing coat, wherein the surrounding rock parameter comprises at least one selected from: flatness of the region to be sprayed and a gap parameter of the region to be sprayed; and the gap parameter of the region to be sprayed comprises at least one selected from: a number of gaps, a gap size and a gap depth.

3. The method according to claim 1, wherein the coating material comprises a first material and a second material, wherein within 180 seconds after completion of the spraying, the sealing coat formed by spraying the first material has a tensile strength>3 MPa, an adhesive strength>1 MPa, a shear strength>5 MPa, an elongation>60%, and a compressive strength>10 MP, and the coating material finally has a tensile strength of >3.5 MPa, a shear strength of >6 MPa, an elongation of >30%, and a compressive strength of >20 MPa, wherein an adhesive property of the first material is greater than that of the second material, and gas tightness of the second material is greater than that of the first material, wherein spraying the coating material onto the surface of the new tunnel to form the sealing coat on the surface of the surrounding rock comprises:

spraying the first material onto the surface of the surrounding rock of the surface of the new tunnel, wherein the first material is adhered to the surface of the surrounding rock in virtue of the adhesive property of the first material; and spraying the second material onto the surface of the surrounding rock sprayed with the first material, to form the sealing coat in virtue of a sealing property of the second material.

4. The method according to claim 1, wherein the coating material is a third material having an adhesive property and a sealing property both meeting a sealing condition.

5. The method according to claim 1, further comprising:
acquiring a coating quality of the region to be sprayed according to an image of the sealing coat during the spraying, and adjusting a spraying angle according to the coating quality.

6. The method according to claim 1, wherein after spraying the coating material onto the surface of the new tunnel to form the sealing coat on the surface of the surrounding rock, the method further comprises:

determining whether the sealing coat meets a supporting requirement; and if the sealing coat does not meet the supporting requirement, continuing spraying the coating material or performing a grouting treatment to a sprayed region not meeting the supporting requirement;

wherein the supporting requirement comprises at least one of: a thickness of the sealing coat reaching a preset thickness threshold, the spraying being uniform, or an air leakage being less than a preset air leakage threshold.

7. The method according to claim 1, wherein the coating material is an organic material, and has a flash point of ≥200° C. and an oxygen index of ≤35%;

wherein the coating material has a maximum reaction temperature of ≤90° C.

8. The method according to claim 1, wherein inserting bolts into the new tunnel to perform permanent supporting comprises:

inserting roof bolts into a top of the new tunnel and inserting rib bolts into two sidewalls of the new tunnel.

9. The method according to claim 1, further comprising:
driving each bolt to rotate in a first direction, and advancing each bolt to drill to a preset depth;

grouting a drilled hole to a preset anchoring length through the grouting channel of each bolt; and driving the pre-tightening nut to rotate in a second direction and pre-tighten.

10. A system for temporary coating supporting and permanent bolt supporting, comprising:

an excavating device, configured to excavate by at least one row pitch to form a new tunnel;

a spraying device, configured to spray a coating material onto a surface of the new tunnel to form a sealing coat on a surface of surrounding rock, wherein within 300 seconds after completion of the spraying, the sealing coat formed by the coating material has a tensile strength of >1 MPa, an adhesive strength of >0.5 MPa, a shear strength of >1 MPa, an elongation of >30%, and a compressive strength of >2 MPa, and the coating material finally has a tensile strength of >3 MPa, a shear strength of >4 MPa, an elongation of >30%, and a compressive strength of >20 MPa;

a bolt, having a grouting channel therein in a length direction thereof; wherein the bolt is provided with a drilling bit at a first end thereof, and the drilling bit is provided with a grout outlet communicated with the grouting channel, the bolt is provided at a second end thereof with a limiting block, a pre-tightening nut, a self-aligning ball gasket and a tray in sequence in a direction from the second end to the first end of the bolt, and the second end of the bolt has a screw thread fitted with the pre-tightening nut, and the limiting block is provided with a grouting through-hole communicated with the grouting channel; and a permanent supporting device, configured to insert the bolt into the new tunnel to form permanent supporting.

11. The system according to claim 10, wherein the spraying device comprises:
- a third mechanical arm, disposed on a body;
- a spraying assembly, having a spraying end connected to the third mechanical arm; and
- a driving assembly, disposed on the body and connected to the third mechanical arm, and configured to drive the third mechanical arm to enable the spraying end to spray the coating material onto the surface of the new tunnel to form the sealing coat.

12. The system according to claim 11, wherein the spraying assembly comprises:
- a spraying head, configured as the spraying end of the spraying assembly and connected to the third mechanical arm;
- a storage area;
- a pumping equipment; and
- a transporting pipeline, connecting the spraying head with the storage area,
- wherein the pumping equipment is configured to pump the coating material from the storage area to the spraying head via the transporting pipeline for spraying out through the spraying head.

13. The system according to claim 12, wherein the spraying head comprises one or more nozzles with different spraying directions, is connected to the third mechanical arm through a rotating member and is rotatable in any direction around the third mechanical arm through the rotating member.

14. The system according to claim 10, further comprising a bolt supporting device for drilling, grouting, anchoring and pre-tightening operations, wherein the bolt supporting device further comprises:
- a bolt mechanism, comprising the bolt;
- a driving mechanism, connected to the bolt mechanism and configured to drive the bolt to rotate to perform drilling and pre-tightening operations;
- a grouting mechanism, connected to the grouting channel, and configured to grout the grouting channel; and
- an advancing mechanism, connected to the driving mechanism, and configured to advance the bolt to drill.

15. The system according to claim 14, wherein the driving mechanism comprises a driver, and an output end of the driver is connected to the pre-tightening nut for driving the pre-tightening nut to rotate forwardly or reversely.

16. The system according to claim 14, wherein the advancing mechanism comprises a base and a drilling arm disposed on the base, an output end of the drilling arm is connected to the driving mechanism for advancing the bolt in a drilling direction.

17. The system according to claim 16, wherein the base is provided with a guide rail arranged in the drilling direction, and the driving mechanism is slidably disposed on the guide rail.

* * * * *